(12) United States Patent
Ma et al.

(10) Patent No.: US 11,465,603 B2
(45) Date of Patent: Oct. 11, 2022

(54) ELECTRIC HOVERCRAFT FOR SPORTS COMPETITIONS

(71) Applicants: Rui Ma, La Jolla, CA (US); Qi Ma, La Jolla, CA (US)

(72) Inventors: Rui Ma, La Jolla, CA (US); Qi Ma, La Jolla, CA (US)

( * ) Notice: Subject to any disclaimer, the term of this patent is extended or adjusted under 35 U.S.C. 154(b) by 0 days.

(21) Appl. No.: 17/702,650

(22) Filed: Mar. 23, 2022

(65) Prior Publication Data

US 2022/0242385 A1    Aug. 4, 2022

(51) Int. Cl.
*B60V 1/14*    (2006.01)

(52) U.S. Cl.
CPC ..................... *B60V 1/14* (2013.01)

(58) Field of Classification Search
CPC ........................................................ B60V 1/14
See application file for complete search history.

(56) References Cited

U.S. PATENT DOCUMENTS

| | | | | |
|---|---|---|---|---|
| 7,032,698 B2 * | 4/2006 | Lee | ........................... | B60V 1/04 180/128 |
| 7,306,066 B2 * | 12/2007 | Trojahn | ................. | A63G 33/00 180/117 |
| 7,398,740 B2 * | 7/2008 | Boncodin | ................ | B60V 1/04 114/77 R |
| 8,418,638 B2 * | 4/2013 | Schramer | ............... | B60V 1/043 440/12.5 |
| 10,259,441 B2 * | 4/2019 | Korotin | .................... | B60K 5/12 |
| 2009/0181596 A1 * | 7/2009 | Ichikawa | ............... | A63H 29/10 446/179 |

FOREIGN PATENT DOCUMENTS

| | | | | |
|---|---|---|---|---|
| CN | 202499129 U | * | 10/2012 | |
| CN | 205759685 U | * | 12/2016 | |
| CN | 112706743 A | * | 4/2021 | ............... B60V 1/02 |
| DE | 19725740 A1 | * | 12/1998 | ............... B60V 1/14 |
| GB | 2564105 A | * | 1/2019 | ............... B60V 1/11 |
| KR | 101672192 B1 | * | 11/2016 | ............. B60V 1/145 |
| WO | WO-2014195716 A2 | * | 12/2014 | ............... B60V 1/00 |

* cited by examiner

*Primary Examiner* — Kevin Hurley

(57) ABSTRACT

The utility model relates to an electric hovercraft for sports competitions. It mainly solves the technical problem of serious environmental pollution in the existing hovercraft for sports competitions. The technical scheme is: an electric hovercraft for sports competitions, comprising an air-cushion apron, a rudder, an elevator, a thrust cylinder, a thrust fan, a hull, a steering handle and a lift fan, wherein: it also includes two continuously variable electric motors, a motor Bracket, battery, controller, the motor bracket is arranged at the rear of the hull and in front of the thrust cylinder, the first continuously variable speed electric motor is mounted on the motor bracket, and the shaft of the first continuously variable speed electric motor is connected to the rotating shaft of thrust fan. The second continuously variable speed electric motor is arranged on the top surface of the front part of the hull through a support rod and is connected with the lift fan, the battery is installed in the rear of the hull and is located below the motor bracket, the controller is arranged on the front panel inside the hull and is electrically connected with the first continuously variable speed electric motor, the battery and the second continuously variable speed electric motor.

1 Claim, 1 Drawing Sheet

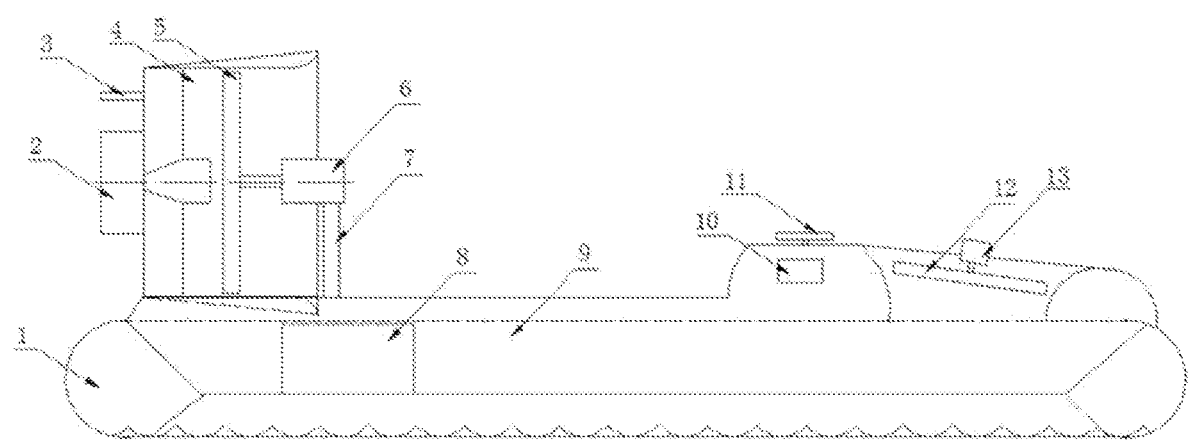

ELECTRIC HOVERCRAFT FOR SPORTS COMPETITIONS

TECHNICAL FIELD

The utility model relates to an electric hovercraft specific used for sports competitions, which belongs to the technical field of hovercraft.

TECHNICAL BACKGROUND

Most of the existing hovercraft for sports competitions use diesel engines as the power device to provide thrust and lift power to the hovercraft. Although this hovercraft can improve the speed of the hovercraft for sport competitions, it is easy to pollute the environment due to using diesel engines, which is considered as a serious technical problem.

INVENTION CONTENT

The purpose of this utility model is to solve the technical problem of serious environmental pollution in the existing hovercraft for sports competitions, and to provide an electric hovercraft specific used for sports competitions.

To solve the above-mentioned technical problems, the technical scheme adopted by this utility model is:

An electric hovercraft specific used for sports competitions, comprising an air-cushion apron, a rudder, an elevator, a thrust cylinder, a thrust fan, a hull, a steering handle and a lift fan, wherein, it also includes a first continuously variable speed electric motor, a motor bracket, a battery, a control and a second continuously variable speed electric motor. The motor bracket is arranged at the rear of the hull and in front of the thrust cylinder. The first continuously variable speed electric motor is mounted on the motor bracket. The shaft of the first continuously variable speed electric motor is connected with the rotating shaft of the thrust fan. The second continuously variable speed electric motor is arranged in the front of the hull and connected with the lift fan through the connecting shaft. The battery is installed in the rear of the hull and is located below the motor bracket. The controller is arranged on the front panel inside the hull and is electrically connected with the first continuously variable speed electric motor, the battery and the second continuously variable speed electric motor.

The beneficial effects of the present utility model are:

The utility model adopts the stepless variable speed electric motor as the power device and solves the technical problem of serious environmental pollution in the existing hovercraft specific used for sports competitions. Therefore, compared with the technical background, the present invention has the advantages of high efficiency and environmental protection.

ATTACHED FIGURE INSTRUCTION

FIG. 1 is a schematic structural diagram of the present invention.

In the FIGURE, 1—air cushion apron; 2—rudder; 3—elevator; 4—thrust cylinder; 5—thrust fan; 6—the first continuously variable electric motor; 7—motor bracket; 8—battery; 9—hull; 10—controller; 11—steering handle; 12—lifting fan; 13—the second continuously variable electric motor.

DESCRIPTION IN DETAILS

The present utility model will be further described below in conjunction with the accompanying drawings and embodiments.

As shown in FIG. 1, an electric hovercraft for sports competitions in this embodiment includes an air-cushion apron 1, a rudder 2, an elevator 3, a thrust cylinder 4, a thrust fan 5, a hull 9, a steering handle 11 and a lift fan 12, wherein: it also includes a first continuously variable speed electric motor 6, a motor bracket 7, a battery 8, a controller 10 and a second continuously variable speed electric motor 13, the motor bracket 7 is arranged in the rear of the hull 9 and in the front of the thrust cylinder 4, the first continuously variable speed electric motor 6 is mounted on the motor bracket 7 and the shaft of the first continuously variable speed electric motor 6 is connected with the rotating shaft of the thrust fan 5, the second continuously variable speed electric motor 13 is arranged in the front side of the hull 9 and is connected with the lift fan 12 through the connecting shaft 13, the battery 8 is installed in the rear side of the hull 9 and is located below the motor bracket 7, the controller 10 is arranged on the front panel of the hull 9 and it is electrically connected with the first continuously variable speed electric motor 6, the battery 8 and the second continuously variable speed electric motor 13.

The steering handler 11 is arranged on the front top of the hull 9 and at the rear of the Lifting fan 12, the thrust cylinder 4 is installed on the top of the hull 9, the thrust fan 5 is installed in the front of the thrust cylinder 4, and the elevator 3 is set at the rear top of the thrust cylinder 4, the rudder 2 is installed vertically at the rear of the thrust cylinder 4 and under the elevator 3, the rudder 2 and the elevator 3 are connected with handler 11 by steel ropes, and the air cushion apron 1 is installed around the hull 9.

The invention claimed is:

1. An electric hovercraft for sports competitions, comprising an air-cushion apron, a rudder, an elevator, a thrust cylinder, a thrust fan, a hull, a steering handle and a lift fan, and is characterized in that: it also includes a first continuously variable speed electric motor, a motor support, a battery, a controller and a second continuously variable speed electric motor, the motor support is arranged at the rear of the hull and in front of the thrust cylinder, the first continuously variable speed electric motor is mounted on the motor support and the shaft of the first continuously variable speed electric motor is connected with the rotating shaft of the thrust fan, the second continuously variable motor is arranged on the top surface of the front part of the hull through a support rod and connected with the lift fan, and the battery is installed in the rear of the hull and is located in the motor bracket below, the controller is provided on the front panel inside the hull and is electrically connected to the first continuously variable speed electric motor, the battery and the second continuously variable speed electric motor.

* * * * *

UNITED STATES PATENT AND TRADEMARK OFFICE
CERTIFICATE OF CORRECTION

PATENT NO. : 11,465,603 B2
APPLICATION NO. : 17/702650
DATED : October 11, 2022
INVENTOR(S) : Qi Ma and Rui Ma It is certified that error appears in the above-identified patent and that said Letters Patent is hereby corrected as shown below:

On the Title Page

Item (30) add:
CN 202120322383.X filed February 4, 2021

Signed and Sealed this
Tenth Day of September, 2024

Katherine Kelly Vidal
*Director of the United States Patent and Trademark Office*